United States Patent [19]

Yamada et al.

[11] Patent Number: 4,643,536
[45] Date of Patent: Feb. 17, 1987

[54] REAR CONVERSION LENS

[75] Inventors: Yasuyuki Yamada, Tokyo; Yasuhisa Sato, Kanagawa; Hiroki Nakayama, Kanagawa; Kouji Oizumi, Kanagawa, all of Japan

[73] Assignee: Canon Kabushiki Kaisha, Tokyo, Japan

[21] Appl. No.: 750,699

[22] Filed: Jun. 28, 1985

[30] Foreign Application Priority Data

Jul. 2, 1984 [JP] Japan .................................. 59-137021

[51] Int. Cl.⁴ .......................... G02B 9/12; G02B 15/02
[52] U.S. Cl. ...................................... 350/422; 350/474
[58] Field of Search ................................ 350/422, 474

[56] References Cited

U.S. PATENT DOCUMENTS 4,264,151  4/1981  Okano .................................. 350/422

FOREIGN PATENT DOCUMENTS 0073714  5/1982  Japan .................................... 350/474

*Primary Examiner*—John K. Corbin
*Assistant Examiner*—Rebecca D. Gass
*Attorney, Agent, or Firm*—Toren, McGeady and Goldberg

[57] ABSTRACT

A conversion lens upon attachment on the image side of a master lens increases the focal length of the entire system. The conversion lens comprises three components of negative, positive and negative powers in this order from the front, has a negative power as a whole, and satisfies the following conditions:

$$2.0 < f1/f3 < 4.0$$

$$0.8 < |f2/f3| < 1.2$$

$$n1 - n2 > 0.15$$

where fi and ni are the focal length and the refractive index of the glass of the i-th component counting from the front respectively.

6 Claims, 8 Drawing Figures

REAR CONVERSION LENS

Background of the Invention

1. Field of the Invention

This invention relates to attachment lenses, and more particularly to rear conversion lenses of small size with high performance upon attachment to the image side of master lenses to increase the focal length of the entire system.

2. Description of the Prior Art

There have been proposed a wide variety of conversion lenses upon attachment either on the object side or on the image side of master lenses to change the focal length of the entire system while maintaining constant the focal plane of the entire system. Of these, the ones which are attached to the front of the master lens, or the so-called front conversion lenses, tend to increase the lens diameter, making it difficult to achieve an advance in the compactness of the entire system. The other ones which are used on the image side of master lenses, or the so-called rear conversion lenses, are more advantageous in reducing the lens diameter than the front conversion lenses, but their aberrational problem becomes more difficult to solve without increasing the number of components. This leads to an increase in the total length of the lens.

In Japanese Laid-Open Patent application No. SHO 54-97423, the master lens is moved forward to create a space into which a conversion lens is then put to change the focal length of the entire system. Because of its having as many components as 6, however, such a rear conversion lens tends to become long in total length.

Japanese Laid-Open Patent application No. SHO 58-195817 discloses another rear conversion lens which is relatively small in size so that the focal length of the entire system is changed while still permitting the back focal distance of the entire system to be shortened. But, the change of the focal length is 1.25 times. Such a conversion ratio is not always sufficient.

In general, to incorporate the conversion lens in the interior of the camera, in most cases a diaphragm mechanism and a shutter mechanism are arranged in between the master lens and the conversion lens. For this reason, it is desirable from the standpoint of efficiency in structure that the separation between these two lenses is as wide as possible, but there was a drawback that the size of the combined lens increases objectionably. To make compatible the requirements of increasing the separation between the master and conversion lenses and of minimizing the size of the total lens system, the refractive power of the conversion lens must be strengthened. But, the use of this method causes production of large aberrations and the Petzval sum particularly increases with an increase in the difficulty of correcting field curvature. Large coma also appears over the entire area of the image frame and is difficult to correct.

A first object of the present invention is to provide a rear attachment lens of reduced size with an improved optical performance for increasing the focal length of a master lens.

A second object is to improve the conversion ratio while preserving a high grade correction of aberrations without having to increase the number of components.

A third object is to prevent deterioration of field curvature.

A fourth object is to properly correct coma over the entire area of the image frame.

SUMMARY OF THE INVENTION

A conversion lens upon attachment on the image side of a master lens to increase the focal length, having a negative overall refractive power, consisting of a negative front lens, a positive middle lens and a negative rear lens, and satisfying the following conditions:

$$2.0 < f_1/f_3 < 4.0$$

$$0.8 < |f_2/f_3| < 1.2$$

$$n_1 - n_2 > 0.15$$

where $f_1$, $f_2$ and $f_3$ are the focal lengths of the front, middle and rear lenses respetively, and $n_1$ and $n_2$ are the refractive indices of the front and middle lenses respectively.

DETAILED DESCRIPTION OF THE PREFERRED EMBODIMENTS

Figure 3:
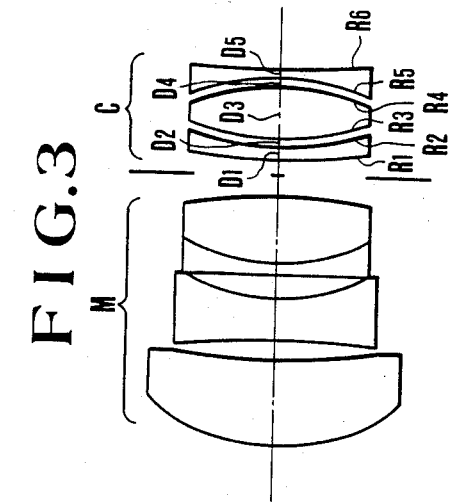
FIG. 3 is a longitudinal section view of an example of a conversion lens attached to the master lens.
Figure 7:
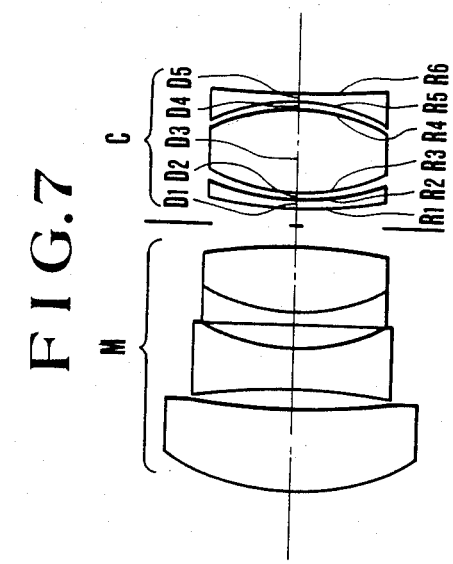
FIG. 7 is a longitudinal section view of another example of the conversion lens attached to the master lens.
Figure 1:
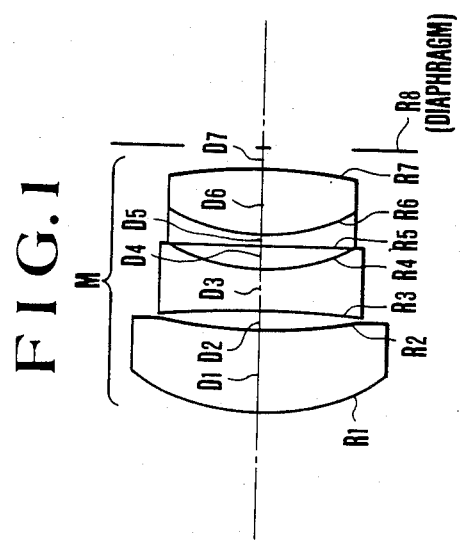
FIG. 1 is a longitudinal section view of a master lens according to the present invention.
Figure 5:
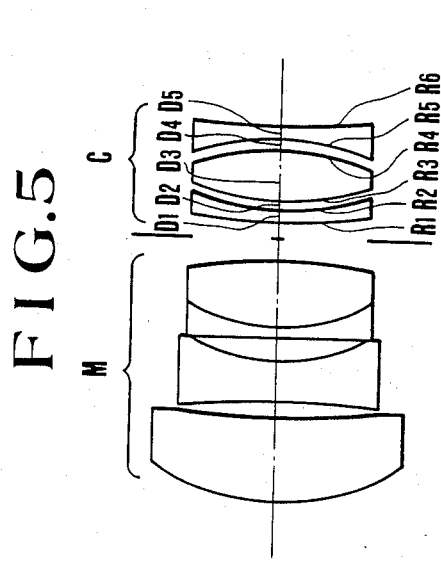
FIG. 5 is a longitudinal section view of another example of the conversion lens attached to the master lens.
Figure 2:
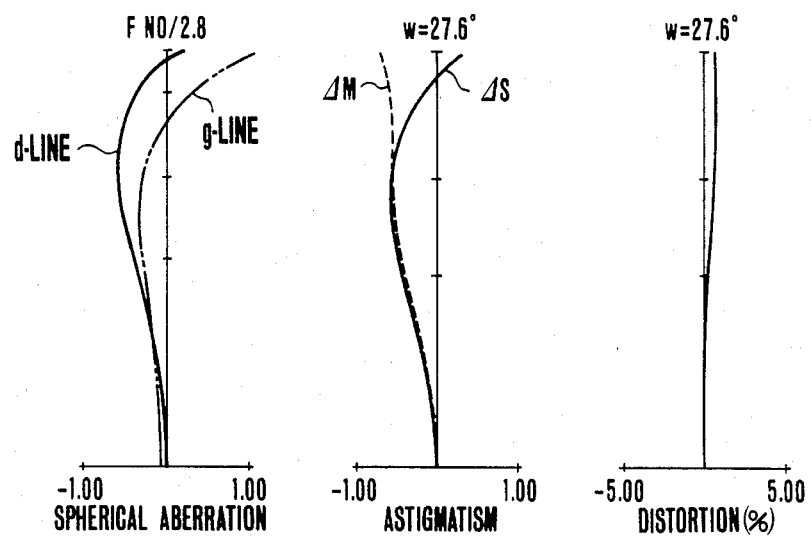
FIG. 2 is a graphic representation of the aberrations of the master lens of FIG. 1 with an object at infinity.
Figure 2:
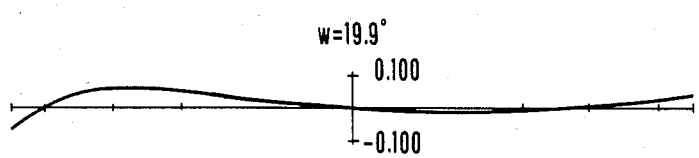
Figure 4:
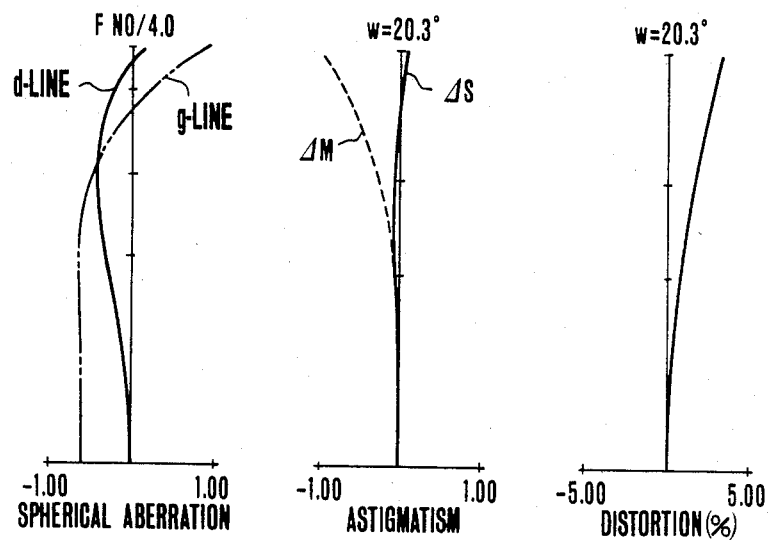
FIG. 4 is a graphic representation of the aberrations of the combined lens of FIG. 3 with an object at infinity.
Figure 4:
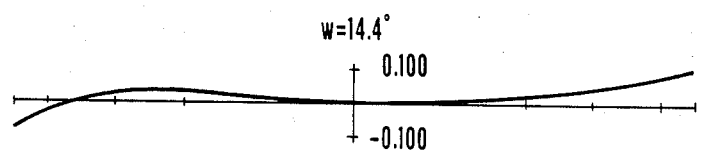
Figure 6:
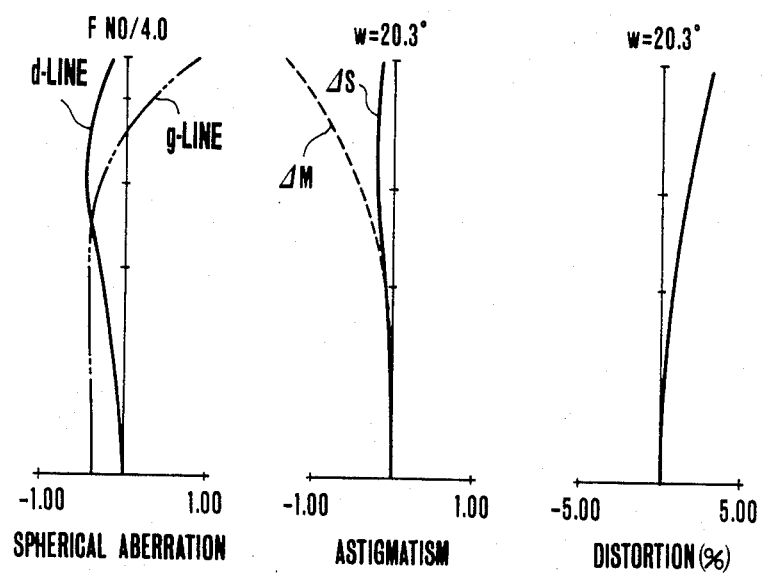
FIG. 6 is a graphic representation of the aberrations of the combined lens of FIG. 5 with an object at infinity.
Figure 6:
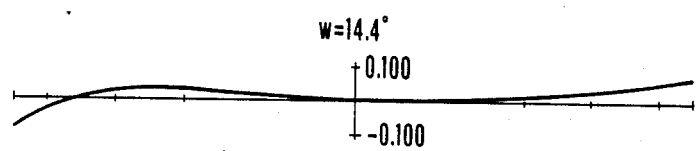
Figure 8:
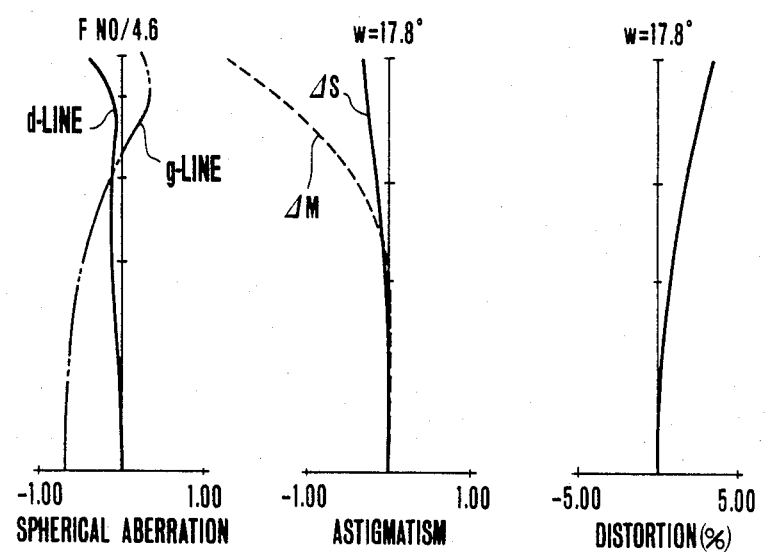
FIG. 8 is a graphic representation of the aberrations of the combined lens of FIG. 7 with an object at infinity.
Figure 8:
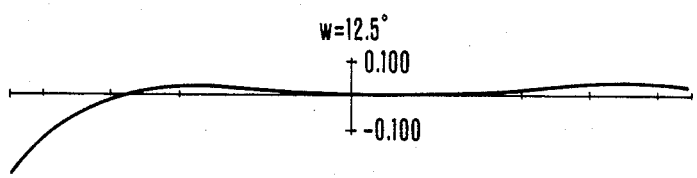

In FIG. 1 there is depicted an example of the photographic lens corresponding to the master lens in this patent application. FIG. 3, FIG. 5 and FIG. 7 illustrate how conversion lenses C are attached to a master lens M. That is, these conversion lenses C are respectively positioned on the image side of the master lens M to increase the focal length of the master lens M. Each conversion lens C is constructed with three components of which the first, second and third counting from the front are of negative, positive and negative powers respectively, and has an overall refractive power of a negative sign, and satisfies the following conditions:

$$2.0 < f_1/f_3 < 4.0 \tag{1}$$

$$0.8 < |f_2/f_3| < 1.2 \tag{2}$$

$$n_1 - n_2 > 0.15 \tag{3}$$

where $f_1$, $f_2$ and $f_3$ are focal lengths of the first, second and third components respectively, and $n_1$ and $n_2$ are refractive indices of the glasses of the first and second components respectively.

Thus, in the present invention, the necessary number of components in the conversion lens C is limited to three and these three components are given prescribed conditions so that conversion lens C of simple form with good aberration correction and a conversion ratio of as high as about 1.5 is realized.

The technical significances of the above-cited conditions are explained below.

Inequalities of condition (1) are concerned with the ratio of the refractive powers of the first and third components. To obtain a conversion ratio of 1.5 or more as in the present invention, there is a need to impart into the conversion lens C a relatively strong negative refractive power. When the condition (1) is properly satisfied, that negative refractive power is distributed on the first and third components to assist in achieving correction of aberrations, since the Petzval sum does not largely increase in the negative sense. When the upper limit of inequalities of condition (1) is exceeded, the refractive power of the third component becomes too strong, and, when the lower limit is exceeded, the refractive power of the first component becomes too strong. In either case, an unduly large increase of the Petzval sum in the negative sense results, making it difficult to properly correct all aberrations, particularly minimizing curvature of the field.

The factor in the inequalities of condition (2) represents the ratio of the refractive powers of the second and third components. Since the negative refractive power is divided in a proper ratio as defined by inequalities of condition (1) between the first and third components, for a proper value of positive refractive power lying in the range defined by the inequalities of condition (2) is put by the second component into the space between the first and third components, the conversion ratio is increased to a desired value while still permitting proper correction of all aberrations to be achieved. When the upper limit of the inequalities of condition (2) is exceeded, the negative refractive power of the third component becomes too strong, and, as the negative Petzval sum increases, the field curvature is increased objectionably. When the lower limit is exceeded, the positive refractive power of the second component becomes too strong and, therefore, the overall negative refractive power of the conversion lens C is decreased, thereby making it difficult to obtain the desired conversion ratio and to correct coma in the intermediate to the marginal zone of the image frame.

An inequality of condition (3) is concerned with the difference between the refractive indices of the glasses of the first and second components, and is to maintain the Petzval sum of the entire system at such an appropriate value as to reduce the coma over the entire area of the image frame and the field curvature. When the lower limit of the inequality of condition (3) is exceeded, the coma and field curvature increase objectionably. Note, the upper limit of the range for n1−n2 is automatically determined by the refractive indices n1, n2 of available glasses.

Though the objects of the invention are accomplished by satisfying the above-stated various conditions, it is further preferred that the first component is formed to a meniscus lens convex toward the front, the second component to a bi-convex lens, and the third component to a bi-concave lens. Thereby, the change of the aberrations resulting from the attachment of the conversion lens C is minimized, and coma and astigmatism are corrected for high grade image quality over the entire area of the image frame. Particularly, it is preferred that radii of curvature, r1 and r5, of the first and fifth lens surfaces counting from the front lie in the following ranges:

$$0.35 < \left| \frac{r1}{F} \right| < 0.65 \quad (4)$$

$$0.1 < \left| \frac{r5}{F} \right| < 0.3 \quad (5)$$

where F is the focal length of the entire system of the conversion lens c.

The inequalities of condition (4) are concerned with the refractive power of the front lens surface of the first component. When the refractive power becomes too weak and exceeds the upper limit, the back focal distance becomes too long and, therefore, the total length of the lens increases greatly. When the lower limit is exceeded, as the refractive power becomes too strong, under-correction of spherical aberration results.

The inequalities of condition (5) are concerned with the refractive power of the front lens surface of the third component. When the negative refractive power becomes too weak and exceeds the upper limit, under-correction of coma results. When the negative refractive power becomes too strong and exceeds the lower limit, coma is objectionably increased in the marginal zone of the image frame.

The negative refractive power of the conversion lens of the invention is preferably determined so that when attached to the master lens M, the conversion ratio falls within a range of 1.4 to 1.7, from the standpoint of aberration correction. Particularly, in terms of the focal length f of the master lens M, it is preferred to satisfy the following condition:

$$0.4 < \left| \frac{f}{F} \right| < 0.85 \quad (6)$$

When the refractive power of the conversion lens C is stronger than the upper limit of the inequality of condition (6), the aberrations change. When the refractive power of the conversion lens C is weaker than the lower limit, it becomes difficult to obtain a sufficiently large conversion ratio.

As for a separation D2 between the first and second components and a separation D4 between the second and third components, it is preferred to satisfy the following condition:

$$0.7 < D2/D4 < 1.5 \quad (7)$$

Though the master lens M with which the conversion lenses C of the invention are used is shown to be of the Tessar type in embodiments to be described later, the type of the master lens M is not confined to the Tessar type, but may be, for example, Gauss type, triplet type, and Sonnar type.

In the present invention, focusing of the combined system of the master M and the conversion lenses C is performed by bodily moving the system forward, or by moving the master and conversion lenses M, C forward but in differential relation to each other, because proper stability of aberration correction can be obtained throughout the entire focusing range. Another focusing method of moving either the master lens M or the conversion lens C may be employed.

As has been described above, according to the present invention, a rear conversion lens C of reduced size which is properly corrected for aberrations can be realized.

Next, a numerical example of the master lens M and three examples of the conversion lens C of the invention used with the master lens M are shown in the following tables for radii of curvature, R, axial thicknesses and air separations, D, and the refractive indices, N, and Abbe numbers, $\nu$, of the glasses of the lens elements with the subscripts numbered consecutively from front to rear. In the tables for the examples of a conversion lens, F', FNO and $2\omega$ denote respectively focal length, F-number and image angle of the entire system with inclusion of the master lens M. When the conversion lens C is attached to tne master lens M, the space therebetween is 2.35, 2.35 or 2.41 in the numerical example 1, 2 or 3 respectively.

Numerical Example of Master Lens
F = 100 FNO = 1:2.8 $2\omega$ = 55.13° B.F. (Back Focus) = 73.86

| | | | |
|---|---|---|---|
| R1 = 34.14 | D1 = 12.06 | N1 = 1.77250 | $\nu$1 = 49.6 |
| R2 = 110.80 | D2 = 2.40 | | |
| R3 = −177.63 | D3 = 5.79 | N2 = 1.72151 | $\nu$2 = 29.2 |
| R4 = 29.84 | D4 = 3.31 | | |
| R5 = 242.93 | D5 = 1.88 | N3 = 1.58144 | $\nu$3 = 40.7 |
| R6 = 31.81 | D6 = 9.65 | N4 = 1.80610 | $\nu$4 = 40.9 |
| R7 = −81.83 | D7 = 2.90 | | |
| R8 = Diaphragm | | | |

Numerical Example 1 of Conversion Lens
F' = 141 FNO = 1:4.0 $2\omega$ = 40.59° B.F. = 84.17

| | | | |
|---|---|---|---|
| R1 = 100.32 | D1 = 1.93 | N1 = 1.80610 | $\nu$1 = 40.9 |
| R2 = 50.44 | D2 = 1.20 | | |
| R3 = 47.02 | D3 = 7.18 | N2 = 1.59270 | $\nu$2 = 35.3 |
| R4 = −38.10 | D4 = 1.28 | | |
| R5 = −37.29 | D5 = 1.21 | N3 = 1.80610 | $\nu$3 = 40.9 |
| R6 = 157.93 | | | |
| f1/f3 = 3.431, |f2/f3| = 0.982, n1 − n2 = 0.213 | | | |
| F = −183.9 | | | |

Numerical Example 2 of Conversion Lens
F' = 141 FNO = 1:4.0 $2\omega$ = 40.59° B.F. = 83.83

| | | | |
|---|---|---|---|
| R1 = 100.45 | D1 = 1.93 | N1 = 1.80400 | $\nu$1 = 46.6 |
| R2 = 49.15 | D2 = 1.20 | | |
| R3 = 45.92 | D3 = 7.32 | N2 = 1.58144 | $\nu$2 = 40.7 |
| R4 = −36.75 | D4 = 1.22 | | |
| R5 = −36.37 | D5 = 1.93 | N3 = 1.80400 | $\nu$3 = 46.6 |
| R6 = 180.95 | | | |
| f1/f3 = 3.25, |f2/f3| = 0.967, n1 − n2 = 0.223 | | | |
| F = −184.7 | | | |

Numerical Example 3 of Conversion Lens
F' = 163 FNO = 1:4.6 $2\omega$ = 35.54° B.F. = 91.91

| | | | |
|---|---|---|---|
| R1 = 75.87 | D1 = 1.21 | N1 = 1.88300 | $\nu$1 = 40.8 |
| R2 = 38.56 | D2 = 1.23 | | |
| R3 = 35.91 | D3 = 11.98 | N2 = 1.59270 | $\nu$2 = 35.3 |
| R4 = −32.96 | D4 = 1.07 | | |
| R5 = −32.84 | D5 = 1.21 | N3 = 1.88300 | $\nu$3 = 40.8 |
| R6 = 164.72 | | | |
| f1/f3 = 2.916, |f2/f3| = 1.003, n1 − n2 = 0.290 | | | |
| F = −133.8 | | | |

What is claimed is:

1. A conversion lens upon attachment on the image side of a master lens to increase the focal length, having a negative overall refractive power, consisting of a negative front lens, a positive middle lens and a negative rear lens, and satisfying the following conditions:

$$2.0 < f1/f3 < 4.0$$

$$0.8 < |f2/f3| < 1.2$$

$$n1 - n2 > 0.15$$

where f1, f2 and f3 are the focal lengths of the front, middle and rear lenses respectively, and n1 and n2 are the refractive indices of the front and middle lenses respectively.

2. A conversion lens according to claim 1, satisfying the following conditions:

$$0.35 < \left|\frac{r1}{F}\right| < 0.65$$

$$0.1 < \left|\frac{r5}{F}\right| < 0.3$$

where r1 and r5 are the radii of curvature of the front surfaces of said front and said rear lenses respectively, and F is the overall focal length of said conversion lens.

3. A conversion lens for attachment on the image side of a master lens, consisting of, from front to rear, a negative meniscus lens of forward convexity, a biconvex lens, a negative lens with its front surface of strong curvature concave toward the front, and satisfying the following condition:

$$0.7 < D2/D4 < 1.5$$

where D2 is the axial separation between said negative meniscus lens and said bi-convex lens, and D4 is the axial separation beteween said bi-convex and said negative lens.

4. A conversion lens according to claim 3, wherein said negative lens has its rear surface of weak curvature concave toward the rear.

5. A lens system comprising:
a master lens for forming an image of an object;
a conversion lens attached on the image side of said master lens, having a negative refractive power, and consisting of, from front to rear, a negative front lens with its rear surface of strong curvature concave toward the rear, a bi-convex middle lens and a negative rear lens with its front surface of strong curvature concave toward the front, wherein the radius r1 of curvature of the frontmost surface of said conversion lens and the focal length F of said conversion lens satisfy the following condition:

$$0.35 < \left|\frac{r1}{F}\right| < 0.65$$

6. A lens system according to claim 5, wherein said negative front lens turns its front surface convex toward the front, and said rear lens turns its rear surface concave toward the rear.

* * * * *